Patented June 20, 1939

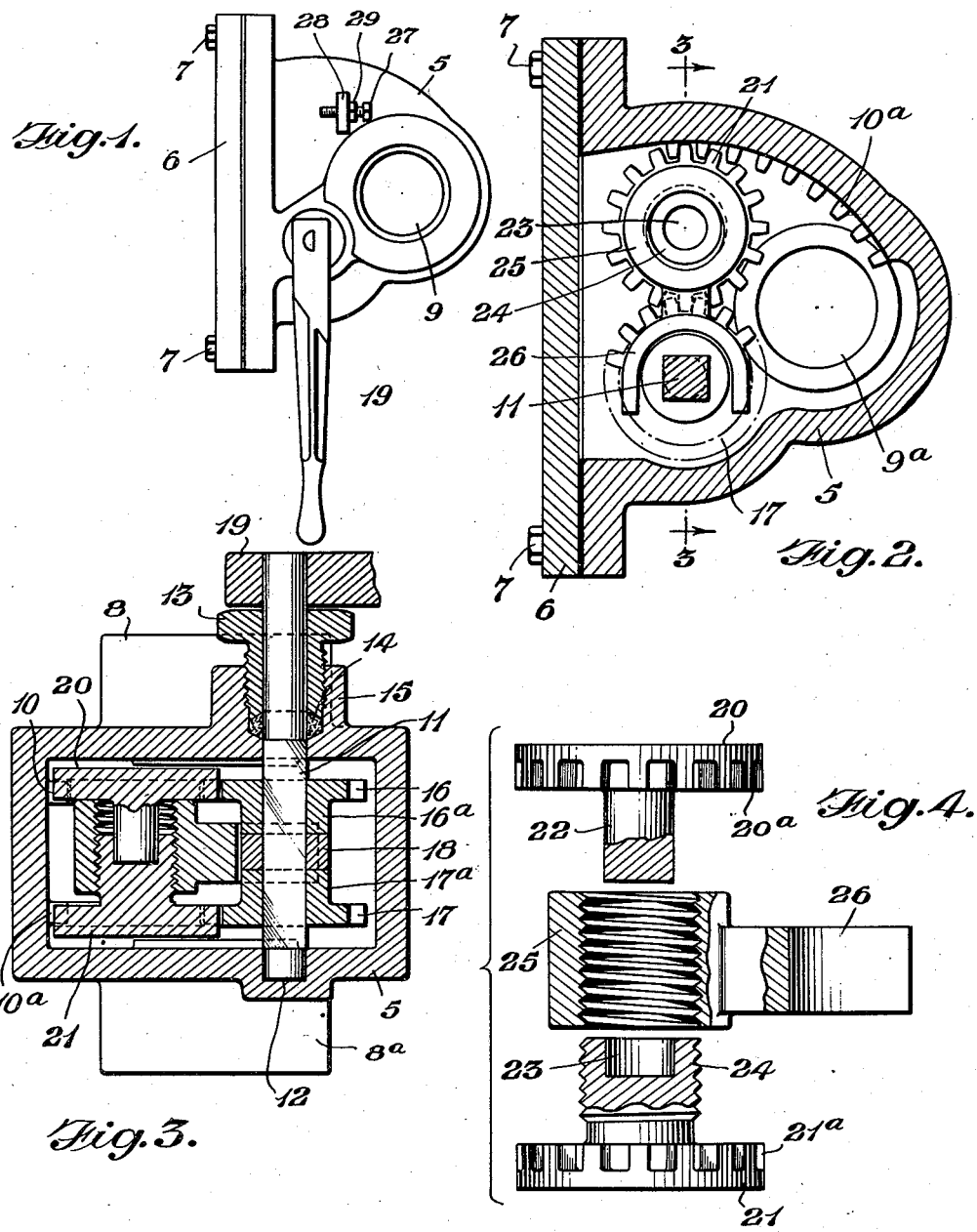

2,162,840

UNITED STATES PATENT OFFICE 2,162,840

VALVE

Virgil L. Du Bois, Tulsa, Okla.

Application December 4, 1937, Serial No. 178,166

5 Claims. (Cl. 251—18)

This invention relates to valves broadly and is particularly concerned with gate valves of the type wherein oppositely disposed expanding and contracting valve discs are utilized and are rotated as they are moved bodily into and from closed positions with respect to their coacting valve seats so as to provide a self-cleaning action.

Objects of the invention include:

To provide a valve of the type specified wherein the valve discs or closure members have an equalized yet smooth and positive seating action;

To provide in a valve of this type means whereby a quick valve action may be had with a maximum of valve-actuating leverage;

To provide for ease in adjustment of the valve discs as well as ease in removal and replacement thereof;

To generally simplify improve valves of this type.

The foregoing and other objects and advantages will become apparent in view of the following description taken in conjunction with the drawing, wherein:

Fig. 1 is a view in end elevation of a valve unit embodying the features of the present invention;

Fig. 2 is a transverse sectional view taken substantially centrally of the valve unit;

Fig. 3 is a section taken substantially on the line 3—3, Fig. 2; and,

Fig. 4 is a disassembled view, partly in section, of the interior valve mechanism.

The valve housing is generally indicated at 5 and is provided with a detachable cover 6 which may be secured in position by screw bolts 7. The opposite ends of the housing are formed with annular bosses 8 and 8a which define substantially coaxial passages 9 and 9a, the bosses 8 and 8a being adapted for connection into a pipe line or analogous fluid or air line in which the valve unit is to be inserted for controlling the passage of fluid through the line.

The valve housing 5 is provided with an arcuate shaped portion, on the interior of which parallel lines of rack teeth 10 and 10a are formed, note Figs. 2 and 3.

A shaft 11 is rotatably mounted in the valve housing and has its one end inserted in a bearing recess 12 and its opposite free or handle end projecting through a journal box or bearing 13 having a packing gland 15 therein, the bearing 13 being removably threaded into a boss 15 formed on the valve housing.

That portion of the shaft 11 which lies within the housing 5 is preferably squared and has mounted thereon a pair of driving gears 16 and 17 formed with hubs 16a and 17a which are maintained in spaced relation by a spacer 18. The outer end of the shaft 11 is provided with a handle 19 whereby the shaft may be manually rotated.

The valve assembly proper comprises valve discs 20 and 21 provided with teeth 20a and 21a, the latter being adapted to mesh with the rack teeth 10 and 10a. The discs 20 and 21 are preferably formed with smooth flat seating faces or surfaces, and said surfaces may be formed of any suitable, preferably non-corrosive and wear resistant, metal or metal alloy. The valve disc 20 is formed with a tub shaft 22 which is adapted to journal in a socket 23 formed on an exteriorly threaded hub 24, the latter in turn being formed as part of the valve disc 21.

A spreader member in the form of an interiorly threaded ring or collar 25 is provided and has formed integral therewith or connected thereto a forked yoke 26 adapted to engage over the spreader 18 and the adjacent hubs 16a and 17a of the gears 16 and 17. The hub 24 of the valve disc 21 is rotatably threaded into the ring or collar 25 so that when the latter is rotated relative movement is set up between the ring 25 and said disc.

To limit the throw of the handle 19 and consequently the bodily arcuate travel of the valve discs 20 and 21, an adjustable contact screw 27 is provided and is threaded through a bracket 28 and locked in position by means of lock nut 29.

The improved valve unit is adapted for high pressure duty, such as oil lines and like installations where self cleaning valves of this type may be used to advantage. Fig. 2 shows the valve in open position with the valve discs 20 and 21 moved arcuately to the end of the rack teeth 10 and 10a, further movement being prohibited by the adjustable stop 27. To close the valve, it is only necessary to rotate the handle 19 to the left to the position shown in Fig. 1. When the shaft 11 is rotated, it in turn rotates gears 16 and 17 which are in mesh with the teeth 20a and 21a of the valve discs 20 and 21. Rotation of said gears moves the said discs bodily in an arcuate path to closed position over the ports or passages 9 and 9a. During this arcuate travel, the spreader ring or collar 25 is caused to turn, thereby moving the ring and yolk laterally, the said ring abutting against the inner side of the disc 20 and causing the discs 20 and 21 to be spread and clamped firmly against the inner valve seats as they are moved into valve closing position.

Due to the fact that the stub shaft 22 is permitted a limited floating action in the socket 23, and further due to the floating action of the yolk 26 on the spreader 18 and the adjacent hubs of the gears 16 and 17, the valve discs 20 and 21 are in turn permitted a limited floating action during the closing and opening movements of the valve so that a self-equalizing and yet positive closing movement of the valve discs is effected. Furthermore, the shaft 11 and coacting yolk arrangement permits a relatively short throw in closing and opening the valve, so that a lever handle of the type indicated at 19 may be utilized. This is of advantage, since it is highly desirable to provide a quick acting valve in certain installations.

To adjust the lateral expanded movement of the valve discs, it is only necessary to remove the cover 6 and adjust the stop 27 so that the teeth 20a and 21a of the valve discs 20 and 21 will move free of the rack teeth 10 and 10a, whereupon the disc 21 may be given a partial turn in the collar 25, thereby either advancing or retracting the spreading action due to the collar 25 and yolk connection 26. In a like manner, the valve discs and coacting parts may be removed from the valve housing and replaced whenever desired.

It will be noted that the mechanism is relatively simple in construction, since there are no fine tolerances and all parts may be cast and assembled in an expeditious manner.

It will be understood that certain changes in construction and design may be adapted within the scope of the invention as defined by the appended claims.

I claim:

1. In a valve of the type described, a valve housing having substantially aligned inlet and outlet ports, opposed relatively-axially-movable toothed valve discs mounted for simultaneous rotary and bodily arcuate movement to close and open said ports, a rotatable valve-actuating shaft mounted in said housing, drive gears mounted on said shaft in mesh with the teeth of said discs, a toothed drive rack in said housing also in mesh with the teeth of said discs, and an expanding and contracting member in the form of a threaded collar mounted between said discs and provided with a yoke member having an auxiliary movable connection with said shaft whereby the collar is held against rotation yet is permitted to move axially between said discs.

2. In a valve of the type described, a valve housing having substantially aligned inlet and outlet ports, opposed relatively-axially-movable toothed valve discs, a toothed rack with which the teeth of the valve discs engage whereby the discs are caused to rotate during bodily movement of the discs, a valve-actuating shaft, drive gears mounted on said shaft in mesh with the teeth of said discs, and a spreader member for said valve discs, said member having a threaded hub connection with at least one of said discs having a yoke portion straddling said shaft, but permitting free relative rotary and axial movement between the yoke and shaft.

3. In a valve of the type described, a valve housing having substantially aligned inlet and outlet ports, opposed relatively-axially-movable toothed valve discs, a toothed rack with which the teeth of said discs engage whereby the discs are caused to rotate during bodily movement thereof, one of said discs having an exteriorly threaded socket hub and the other of said discs being provided with a stub shaft projecting into the socket formed in said hub, a valve actuating shaft, drive gears mounted on said shaft and having teeth meshed with the teeth of said discs, and a valve-disc-expanding member comprising a collar which is threaded on said hub member and is formed with a yoke portion which straddles said shaft with the shaft freely rotatable with respect to the yoke and the latter having limited axial movement on the shaft whereby the collar is held against rotation with respect to said hub while at the same time being permitted limited axial travel with respect to said discs.

4. In a valve of the type described, a valve housing having substantially aligned inlet and outlet ports, the housing being formed with an arcuate shaped portion having toothed racks on the interior thereof, a pair of axially-opposed toothed valve discs, a valve actuating shaft rotatably mounted in said housing, drive gears mounted on said shaft and meshed with the teeth of said discs, an expanding member operatively connected between said discs and having a yoke straddling said shaft, a handle connnected to said shaft, and an adjustable stop for said handle.

5. In a valve of the type described, a valve housing having inlet and outlet ports, said housing being formed with an opening and an arcuate shaped portion having an interiorly toothed rack formed thereon, valve discs having teeth meshed with said rack, a rotatable valve actuating shaft mounted in said housing, drive gears mounted on said shaft having teeth meshed with the teeth of said discs, said discs being removable through said opening upon being rotated beyond open position and free of mesh with said rack, and a removable cover for said opening.

VIRGIL L. DU BOIS.